G. L. McCREADY.
POTATO VINE CUTTER.
APPLICATION FILED DEC. 9, 1914.
1,134,629.
Patented Apr. 6, 1915.
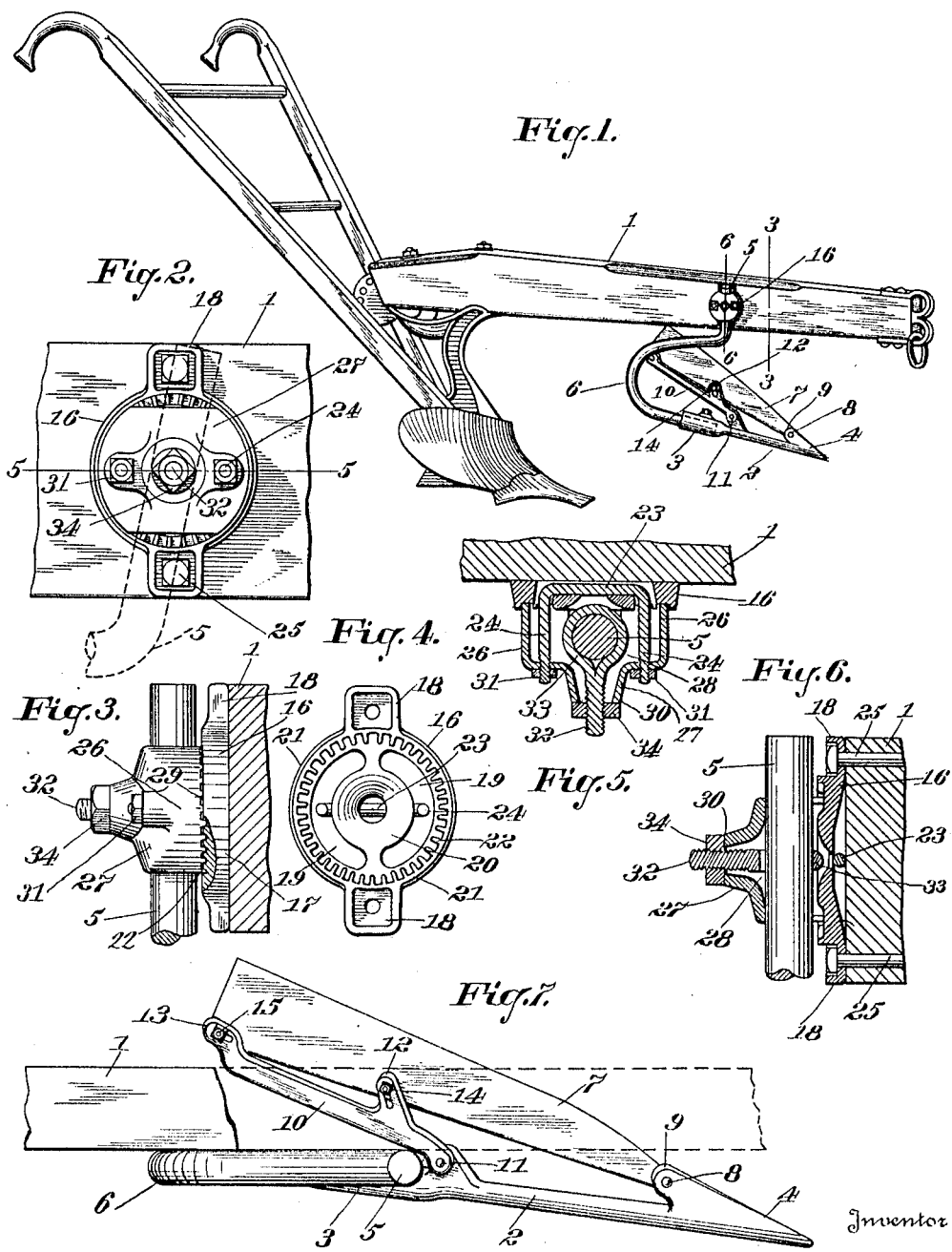

UNITED STATES PATENT OFFICE.

GEORGE LEE McCREADY, OF PARKSLEY, VIRGINIA.

POTATO-VINE CUTTER.

1,134,629.           Specification of Letters Patent.      Patented Apr. 6, 1915.

Application filed December 9, 1914. Serial No. 876,196.

*To all whom it may concern:*

Be it known that I, GEORGE L. MCCREADY, a citizen of the United States, residing at Parksley, in the county of Accomac and State of Virginia, have invented certain new and useful Improvements in Potato-Vine Cutters, of which the following is a specification.

This invention relates to certain improvements in potato-vine cutters that are attached to plows used for digging potatoes.

The object of the invention is to improve the vine-cutter and to provide improved means for attaching the vine-cutters to a plow-beam, whereby an ordinary plow may be used as a potato-digger.

The invention is illustrated in the accompanying drawing in which,—

Figure 1, is a perspective view of a plow with the vine-cutter attached to the beam by the improved means. Fig. 2, is a side view showing on a larger scale the improved means for attaching the vine-cutter shank to the plow-beam. Fig. 3, is a vertical cross-section of the plow-beam on the line 3—3 of Fig. 1 and shows a front view of the shank-attaching means. Fig. 4, is a view of part of the shank-adjuster. Fig. 5, is a horizontal section of parts shown on the line 5—5 of Fig. 2. Fig. 6, is a vertical cross-section of parts on the line 6—6 of Fig. 1. Fig. 7, is a top plan view on a larger scale than Fig. 1 showing the relative positions of the plow-beam and the vine cutter-blade.

Any suitable plow may be used that is adapted to open the ridge of earth that forms the potato row and turn the earth to expose the potatoes; the numeral 1, designates the beam of such a plow.

The potato vine-cutter has a base-arm 2, that is provided with a socket 3, and also carries a tapered point 4, that serves, as the plow moves forward, to cut a score in the earth at the side of the potato ridge, and to take under the potato vines that lie on the surface of the ground, so that said vines will slide upward on the cutting edge of the blade. An upright shank-end 5, joins to a curved arm 6, whose lower end enters and is secured to the said socket 3, of the base-arm. The vine-cutter blade 7, has its front end attached by a pivot bolt 8, to an offset 9, on the side of the tapered point; this pivot permits the high end of the blade to be adjusted. The high end of the blade is held and also adjusted by means of an arm 10, one end of which is pivoted by a bolt 11, to a lug on the base-arm 2. Said adjusting arm has two lateral lugs 12 and 13, both of which are provided with a slot, and two bolts 14 and 15, on the cutter-blade connect respectively with the slots in said lugs, and thereby enable the high end of the cutter to be adjusted vertically relative to the base-arm 2. The cutting edge of the blade 7, is uppermost and inclines upward from the tapered point 4, and the broad flat surfaces of the blade have a position that is inclined laterally at an angle of about forty-five degrees.

The shank-end 5, is the highest part of the vine-cutter device and will ordinarily have an upright or vertical position; this will usually give a suitable down pitch or inclination to the tapered point 4, as seen in Fig. 1, but provision is made for changing this pitch or inclination to suit the conditions of the ground that is to be opened or dug. The means to change the pitch or inclination of the base-arm 2, and point 4, of the vine cutter are embodied in and combined with the parts that make up the device that clamps the upright shank-end 5, to the plow-beam 1. These means consist of a circular plate 16, having a flat rim face 17, that contacts with the side of the plow-beam and two bolt-hole lugs 18, projecting at diametrically opposite sides; this circular-shaped plate has two segment-shaped slots 19, which form a center disk-like portion 20, and two half-circular rims 21, which latter have formed on their outer face small pits or indentations 22, see Figs. 3 and 4. The inner face of the center disk-like portion 20, has a surface that is concave relative to said flat rim-face 17, that contacts with the side of the plow-beam, and the center part 23, of a yoke has position in and across said concavity, while the two screw-threaded prongs 24, of said yoke have position in said two segment slots 19. The circular plate 16, is securely attached to the plow-beam by bolts 25, that pass through the holes in the lugs 18.

A dome-shaped head is shown in Figs. 2, 3, 5 and 6; this device has a nearly-circular wall 26, and a cover 27, that forms what I term a dome; it is hollow or chambered, as at 28, in Fig. 5, and the edge of said circular wall 26, has teeth 29, that engage the pits or indentations, 22, on the circular plate 16, that is attached to the plow-beam. The cover 27, of the dome has a hole 30, in its center neck and at two diametrically opposite sides of the neck is a hole, and the two screw-threaded prongs 24, of the yoke pass through the interior chamber 28, and out through said two side holes, and on the exterior of the cover 27, each prong has a nut 31. The yoke 23, 24, serves to afford a swiveling or part rotary movement to the dome-head, and the teeth 29, on the dome-head, by engaging the pits 22, on the fixed plate 16, and then by tightening nuts 31, will firmly hold said dome-head wherever it may be set. The circular wall 26, has two notches that are diametrically opposite each other; the upright shank-end 5, has position in these two notches and extends crosswise of the interior chamber 28, of the dome-head. An eye-bolt 32, is employed to bind the shank-end 5, tightly to its position in the said two notches of the dome head; the shank-end is slipped through the eye 33, of the bolt, which is in the chamber 28, see Figs. 5 and 6; and the bolt 32, projects through the center hole 30, and on the exterior a nut 34, is on the eye-bolt. By tightening the nut 34, the eye-bolt will draw on the shank-end 5, and thereby the dome-head and shank-end will be firmly gripped or held together. Thus any swiveling or part-rotary movement that may be given to the dome-head, will have the effect to change the position of the shank-end 5, from a vertical to an inclined position, as indicated in Fig. 2, by broken or dotted lines, and this will change the pitch or inclination of the base-arm 2, and point 4, of the vine-cutter.

All the parts of this vine-cutter have been contrived with the view of adapting them to be applied to the beam of an ordinary plow such as every farmer is likely to have. Thus by working the vine-cutter on a plow, the vine-cutter will be in advance of the plow-point and mold-board, and will cut the potato vines on the surface of the ground, and also cut a score in the earth along the potato ridge, then the plow will fully open the ridge and turn the earth over and thereby expose the potatoes. So this device is a vine-cutter and a potato digger.

Having thus described my invention what I claim is,—

1. In a potato vine-cutter the combination of a plow-beam; a chambered dome-head having a circular wall provided with two notches diametrically opposite each other, and said dome having a cover provided with a center hole; a screw-threaded bolt projecting through said center-hole to the outer side and having an eye 33, within the dome chamber; a shank-end extending diametrically through the chamber of the dome-head and resting in said two notches and extending through the said eye of the bolt; a nut on the outer projecting end of said eye-bolt and serving to draw the shank-end tightly into said notches, and means to attach the dome-head to the plow-beam.

2. In a potato vine-cutter, the combination of a plow-beam; a circular plate secured to the side of the plow-beam and having two segment-shaped slots which form a center disk-like portion, and the rim-part of said circular plate provided with indentations; a partly-revoluble dome-head having a circular wall provided with teeth that engage the indentations on the said circular plate; a yoke whose center part is movable under said disk-like portion while the two prongs of the yoke have piston in the segment slots and are secured to the partly-revoluble dome-head; a shank-end secured to said partly-revoluble dome-head and curved downward to the ground, and a vine-cutter blade attached to and carried by said shank.

In testimony whereof I affix my signature in presence of two witnesses.

GEORGE LEE McCREADY.

Witnesses:
J. N. MATTHEWS,
J. M. CHANDLER.

Copies of this patent may be obtained for five cents each, by addressing the "Commissioner of Patents, Washington, D. C."